United States Patent Office 2,813,914
Patented Nov. 19, 1957

---

2,813,914

PROCESS FOR PREPARING A HALOGENATED DIENE

Percy B. Polen, Chicago, Ill., assignor to Velsicol Chemical Corporation, a corporation of Illinois No Drawing. Application February 28, 1955,
Serial No. 491,170

5 Claims. (Cl. 260—648)

This invention relates to the production of novel halogenated bicyclic hydrocarbons. More specifically, the present invention relates to a novel method for the production of hexachlorobicycloheptadiene or more specifically 1,2,3,4,7,7-hexachlorobicyclo (2.2.1)-2,5-heptadiene.

The above compound has utility in the preparation of important insecticidal compounds. These compounds may be prepared by adducting the above diene with cyclopentadiene in a Diels-Alder manner. The product of this adduction is 1,2,3,4,10,10-hexachloro-1,4,5,8-dimethano-1,4,4a,5,8,8a-hexahydronaphthalene commonly known as isodrin. Upon epoxidation of the latter, a product, having a formula 6,7-epoxy-1,2,3,4,10,10-hexachloro - 1,4,5,8 - dimethano - 1,4,4a,5,6,7,8,8a - octahydronaphthalene and known as endrin, results. The above compounds are well known insecticides and have unusual toxicity to insect life.

The composition 1,2,3,4,7,7-hexachlorobicyclo (2.2.1)-2,5-heptadiene has heretofore been prepared by other processes, such as adduction of hexachlorocyclopentadiene and vinyl chloride followed by dehydrohalogenation with alcoholic KOH. While such process produces the diene in good yield, there are certain processing difficulties which make another process not involving a caustic desirable.

The process of the present invention contemplates preparation of said hexachlorobicycloheptadiene by the use of $PCl_3$ and chlorine from 5-hydroxy-1,2,3,4,7,7-hexachlorobicyclo (2.2.1)-2-heptene.

Broadly, the process of the present invention involves the preparation of an adduct of hexachlorocyclopentadiene and vinyl acetate, hydrolysis of that adduct to produce 5-hydroxy-1,2,3,4,7,7-hexachlorobicyclo (2.2.1)-2-heptene, and treatment of this derivative with $PCl_3$ and gaseous chlorine to form 1,2,3,4,7,7-hexachlorobicyclo (2.2.1)-2,5-heptadiene.

The process of the present invention is unusual and unexpected in several respects. Neither of the reagents $PCl_3$ or chlorine alone are operative. Ordinarily, $PCl_3$ and chlorine react to form $PCl_5$, but $PCl_5$ used as reagent does not accomplish the process of the present invention when applied to the starting material. While the action of the reagents is not understood, it is apparent that the action is not explained by a simple mechanism.

The said 5-hydroxy material is readily prepared by first adducting hexachlorocyclopentadiene and vinyl acetate. This adduction proceeds in the straightforward manner of other simple Diels-Alder adducts. The hexachlorocyclopentadiene is preferably placed in a reaction vessel heated to an elevated temperature. The vinyl acetate is slowly introduced in a portionwise manner below the surface of the liquid until the stoichiometric amount has been added plus a slight excess (5 to 10%). The resulting product is recovered as a distillate or may be used without further purification. The temperatures for this reaction are between about 50° C. and about 250° C. The product as prepared above is 5-acetoxy-1,2,3,4,7,7-hexachlorobicyclo (2.2.1)-2-heptene and is further treated by hydrolysis to form the 5-hydroxy material. The latter compound is then readily formed by treatment of the said 5-acetoxy material with aqueous alkali such as sodium hydroxide, or as preferred the compound is prepared by alcoholysis of the acetate by refluxing in an excess of alcohol such as methanol with a small amount of mineral acid catalyst such as HCl.

The 5-hydroxy derivative thus prepared can be treated with $PCl_3$ and chlorine to prepare hexachlorobicycloheptadiene. The starting material is dissolved in an excess of $PCl_3$. The amount of $PCl_3$ used in the present process should be at least equimolar and it is preferred that the reagent be present in at least a molar excess of 100%. Larger proportions of $PCl_3$ are not detrimental since $PCl_3$ acts as solvent, and the optimum excess is determined by waste or cost considerations rather than the operability of the process.

Solvents may be used in the present process, but these solvents should be inert to the reactants such as for example carbon tetrachloride, dichloroethylene, trichloroethylene, hexachlorobutadiene, and the like. It is a preferred procedure to carry out the present reaction in a minimum of such solvent, and since $PCl_3$ is an excellent solvent for the reactants and products, it can be used in excess for a solvent as well as an active reagent.

The chlorine used in the present method is not necessarily a stoichiometric amount, and gaseous chlorine can be introduced in amounts as small as 10 mole percent based on the hydroxy starting material or as much as 100 percent molar excess can be employed. Greater amounts of chlorine may result in chlorination of the double bond and thus remove the desired dienic functionality of the product. Generally, from 50 to 150 mole percent based on weight of 5-hydroxy-1,2,3,4,7,7-hexachlorobicyclo (2.2.1)-2-heptene is satisfactory. The chlorine is introduced into the reaction mixture as a gas by bubbling it slowly below the surface of the liquid reactants. The reaction once initiated proceeds rapidly, and temperatures as low as 0° C. and as high as 150° C. are operable. A preferred range of temperature is from about 25° C. to about 110° C.

The reaction proceeds relatively rapidly even at low temperatures, and the rate increases in a proportionate manner with the increase in temperature. Generally at the lower temperatures of the range indicated about six hours are necessary for completion, while at more elevated temperatures the rate of reaction is such that it is complete in about thirty minutes.

Pressure is not a critical factor in the present process and open vessels at atmospheric pressures may be used, but the reaction may also be run at mildly superatmospheric pressures especially at temperatures above the boiling point of $PCl_3$, or the reaction may be run at slightly below atmospheric pressure without adverse effect. Since the reagent $PCl_3$ boils at about 75° C. at normal atmospheric pressure, it is preferred when operating at the more elevated temperatures to keep the reactants under pressure.

Since phosphorus trichloride and chlorine are reactive to moisture and after such contact are unreactive in regard to this process, precautions must be taken to exclude water or water vapor from the reaction mixture.

The following examples will illustrate the preparation of the 5 - hydroxy - 1,2,3,4,7,7-hexachlorobicyclo (2.2.1)-2-heptene starting material, and the final hexachlorobicycloheptadiene:

EXAMPLE I

A. *Preparation of 5-acetoxy-1,2,3,4,7,7-hexachlorobicyclo (2.2.1)-2-heptene*

Into a 3-necked flask equipped with a stirrer, reflux condenser, and addition funnel was placed hexachlorocyclopentadiene (545.6 g.; 2.0 mol) and heated to 190° C. The vinyl acetate (172.2 g.; 2.0 mol) was slowly added below the surface of the hexachlorocyclopentadiene from the addition funnel over a six-hour period with constant stirring. The reaction mixture was steam-distilled and the residue was dissolved in hexane, dried over anhydrous $Na_2SO_4$, treated with activated charcoal, and filtered. The filtrate was concentrated by evaporation of hexane solvent and the product crystallized at low temperature from the concentrated liquor. The product was purified by recrystallization from hexane and melted at 43 to 44° C. and was the desired acetoxy derivative.

B. *Preparation of 5-hydroxy - 1,2,3,4,7,7 - hexachlorobicyclo (2.2.1)-2-heptene*

The product 5 - acetoxy-1,2,3,4,7,7-hexachlorobicyclo (2.2.1)-2-heptene as prepared in part A above was subjected to methanolysis by dissolving 200 grams of the acetate in 300 ml. of methanol. Gaseous HCl was bubbled into the solution until it was saturated and the reaction mixture heated at reflux. The methyl acetate by-product was permitted to escape during the reflux period of four hours. The reaction mixture was permitted to cool and excess methanol removed by evaporation on a steam bath. Final traces of methanol were removed by addition of hexane and azeotropic distillation. The crude product was retained in hexane solution, treated with activated charcoal, and filtered. The filtrate was permitted to cool and the product recovered as crystals melting at 152.0–152.5° C. was the desired 5-hydroxyhexachlorobicycloheptene and had the following analysis:

|  | C | H | Cl |
| --- | --- | --- | --- |
|  | Percent | Percent | Percent |
| Calculated for $C_7H_4OCl_6$ | 26.53 | 1.27 | 67.14 |
| Found for product | 26.50 | 1.43 | 66.76 |

EXAMPLE II

Into a glass reaction vessel containing gas inlet sparger, thermometer, and an attached absorption train for collection of chlorine was placed (15.8 g.; 0.05 mol) of 5-hydroxy-1,2,3,4,7,7-hexachlorobicyclo (2.2.1)-2-heptene dissolved in 15 ml. of $PCl_3$. Chlorine was added through the sintered glass sparger at a low controlled rate. An immediate reaction takes place and a crystalline precipitate forms. On heating to 110° C. and the further addition of chlorine, the reaction mixture became homogeneous. The heating at 110° C. was continued for two hours after which time the addition of chlorine was discontinued. The contents of the flask were poured into crushed ice and the mixture was extracted with isopropyl ether. The isopropyl ether was removed by evaporation. The residue was an oil which was fractionally distilled and the cut boiling at 87–91° C. at 0.5 mm. mercury pressure (absolute) was recovered. This liquid had an index of refraction of $n_D^{20}$ 1.5545 and was the desired 1,2,3,4,7,7 - hexachlorobicyclo (2.2.1)-2,5-heptadiene.

As in the foregoing example, the addition of gaseous chlorine is continuous over the greater part of the reaction period. The addition was continued until the reaction mixture became clear and homogeneous. This is a convenient method of determining when the reaction is complete and generally such procedure is preferred.

The product of the process of the present invention is useful as an intermediate in the preparation of the known insecticides isodrin and endrin, the latter being more particularly described in United States Patent No. 2,676,132. In addition, it may be used as an organic intermediate in the preparation of other insecticides or in the manufacture of pharmaceuticals and other chemicals.

I claim:

1. The method of preparing 1,2,3,4,7,7-hexachlorobicyclo-(2.2.1)-2,5-heptadiene which comprises reacting 5-hydroxy - 1,2,3,4,7,7 - hexachlorobicyclo - (2.2.1) - 2 - heptene with $PCl_3$ and gaseous chlorine under substantially anhydrous conditions, at a temperature between about 0° C. and about 150° C. and recovering from said reaction mixture the said hexachlorobicycloheptadiene.

2. The method of preparing 1,2,3,4,7,7-hexachlorobicyclo-(2.2.1)-2,5-heptadiene which comprises reacting 5 - hydroxy - 1,2,3,4,7,7 - hexachlorobicyclo - (2.2.1) - 2-heptene with a molar excess of $PCl_3$ in the presence of gaseous chlorine under substantially anhydrous conditions, at a temperature between about 0° C. and about 150° C. and recovering from said reaction mixture the said hexachlorobicycloheptadiene.

3. The method of preparing 1,2,3,4,7,7-hexachlorobicyclo-(2.2.1)-2,5-heptadiene which comprises reacting 5 - hydroxy - 1,2,3,4,7,7 - hexachlorobicyclo - (2.2.1) - 2-heptene with a molar excess of $PCl_3$ and continuously introducing to said reaction mixture a stream of gaseous chlorine in aggregate amount not exceeding a 100 percent molar excess of said hydroxy reactant, at a temperature between about 0° C. and about 150° C., and under substantially anhydrous conditions, and recovering from the reaction mixture the said hexachlorobicycloheptadiene.

4. The method of preparing 1,2,3,4,7,7-hexachlorobicyclo-(2.2.1)-2,5-heptadiene which comprises reacting 5 - hydroxy - 1,2,3,4,7,7 - hexachlorobicyclo - (2.2.1) - 2-heptene with from about an equimolar amount to about a 100 percent molar excess of $PCl_3$ and continuously introducing to said reaction mixture a stream of gaseous chlorine in amount of from about 10 mole percent and in aggregate not exceeding 100 mole percent molar excess of hydroxy reactant, at a temperature between about 0° C. and about 150° C., and under substantially anhydrous conditions, and recovering from the resulting reaction mixture the said hexachlorobicycloheptadiene.

5. The process which comprises, adducting hexachlorocyclopentadiene and vinyl acetate to form 5-acetoxy-1,2,3,4,7,7-hexachlorobicyclo-(2.2.1)-2 - heptene, hydrolyzing said adduct to form 5-hydroxy-1,2,3,4,7,7-hexachlorobicyclo-(2.2.1)-2 - heptene, reacting the latter, under substantially anhydrous conditions, with phosphorous trichloride and gaseous chlorine, and recovering 1,2,3,- 4,7,7 - hexachlorobicyclo - (2.2.1) - 2,5 - heptadiene as the product of the process.

References Cited in the file of this patent

UNITED STATES PATENTS 2,336,208     Alder et al.            Dec. 7, 1943

OTHER REFERENCES

Houben-Weyl: "Methoden der organischen Chemie," 4th edition, vol. 2, page 340 (1953).